US010473148B2

(12) United States Patent
Doherty

(10) Patent No.: US 10,473,148 B2
(45) Date of Patent: Nov. 12, 2019

(54) SOCKET ASSEMBLY WITH AN IMPROVED BOOT

(71) Applicant: Federal-Mogul Motorparts Corporation, Southfield, MI (US)

(72) Inventor: Donald R. Doherty, St. Peters, MO (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 345 days.

(21) Appl. No.: 15/263,982

(22) Filed: Sep. 13, 2016

(65) Prior Publication Data
US 2018/0073552 A1    Mar. 15, 2018

(51) Int. Cl.
*F16C 11/06* (2006.01)
(52) U.S. Cl.
CPC ...... *F16C 11/0671* (2013.01); *F16C 2226/00* (2013.01); *Y10T 403/315* (2015.01); *Y10T 403/32729* (2015.01)
(58) Field of Classification Search
CPC ......... Y10T 403/32729; Y10T 403/315; F16C 11/0671; F16C 2226/00; F16C 11/068; F16C 2226/74
See application file for complete search history.

(56) References Cited

U.S. PATENT DOCUMENTS

| | | | | | |
|---|---|---|---|---|---|
| 3,175,834 | A | * | 3/1965 | Wallace | B60G 7/005 277/635 |
| 3,248,955 | A | * | 5/1966 | Templeton | B60G 7/005 277/635 |
| 3,275,353 | A | * | 9/1966 | Turck | F16C 11/0671 403/126 |
| 3,391,952 | A | * | 7/1968 | Zeigler | F16C 11/06 403/126 |
| 3,476,417 | A | * | 11/1969 | Born | B60G 7/005 277/398 |
| 4,121,844 | A | * | 10/1978 | Nemoto | F16O 11/0671 277/635 |
| 5,568,930 | A | * | 10/1996 | Urbach | F16C 11/0671 277/635 |
| 5,735,530 | A | * | 4/1998 | Merkin | F16J 15/164 277/412 |
| 6,834,863 | B2 | * | 12/2004 | Urbach | F16C 11/0671 277/555 |
| 7,261,487 | B2 | * | 8/2007 | Urbach | B60G 7/005 403/114 |

(Continued)

*Primary Examiner* — Matthew R McMahon
(74) *Attorney, Agent, or Firm* — Robert L. Stearns; Dickinson Wright, PLLC

(57) ABSTRACT

The moveable socket assembly which includes a housing that has an inner bore. A stud projects out of the inner bore of the housing, and the stud has a shank portion which is at least partially disposed outside of the inner bore. A boot with a flexible body and an adapter is also provided to seal the housing with the stud. The flexible body and the adapter of the boot are made as separate pieces from one another, and the flexible body extends from a first end portion that is sealed with the housing to a second end portion. The adapter is interposed between the second end portion of the flexible body and the shank portion of the stud, and the adapter holds the second end portion in a predetermined location relative to the shank portion.

18 Claims, 6 Drawing Sheets

(56) References Cited

U.S. PATENT DOCUMENTS

| | | | | |
|---|---|---|---|---|
| 7,438,493 B2* | 10/2008 | Holmes | ............... | F16C 11/0614 |
| | | | | 403/134 |
| 7,670,078 B2* | 3/2010 | Elterman | ............ | F16C 11/0671 |
| | | | | 277/635 |
| 7,704,007 B2* | 4/2010 | Elterman | ................ | F16D 3/845 |
| | | | | 277/635 |
| 7,862,250 B2* | 1/2011 | Kuru | ................... | F16C 11/0666 |
| | | | | 277/635 |
| 8,348,541 B2* | 1/2013 | Mahlmann | ............. | B62D 7/163 |
| | | | | 180/428 |
| 8,684,621 B2* | 4/2014 | Forthaus | ................... | F16C 7/02 |
| | | | | 403/134 |
| 9,068,591 B2* | 6/2015 | Bernhardt | ........... | F16C 11/0633 |
| 9,994,989 B2* | 6/2018 | Coxon | ................. | D06F 37/268 |

* cited by examiner

SOCKET ASSEMBLY WITH AN IMPROVED BOOT

BACKGROUND OF THE INVENTION

1. Field of the Invention

The present invention is related, generally, to socket assemblies and, more particularly, to boots for keeping grease in and contaminants out of socket assemblies.

2. Related Art

Vehicle suspension and steering systems typically include a plurality of socket assemblies for connecting different components that are while still allowing those components to move relative to one another within constraints established by the socket assemblies. Such socket assemblies generally include a housing with an inner bore and a stud that is partially received in the inner bore and extends outwardly therefrom through an open end in the housing. Such socket assemblies also typically include one or more bearings which provide a low friction interface between the housing and the stud to allow the housing and stud to rotate and articulate relative to one another during operation of the vehicle.

One or more boots are sealed against the housing and against the stud for retaining a lubricant within the socket assembly to facilitate the rotation and articulation between the housing and the stud and for keeping contaminants out of the socket assembly. In many instances, the one end of the boot is in direct, surface to surface contact with the stud to establish the seal therebetween.

SUMMARY OF THE INVENTION AND ADVANTAGES

One aspect of the present invention is related to a moveable socket assembly which includes a housing that has an inner bore. A stud projects out of the inner bore of the housing, and the stud has a shank portion which is at least partially disposed outside of the inner bore. A boot with a flexible boot body and an adapter is provided to seal the housing with the stud. The flexible boot body and the adapter of the boot are made as separate pieces from one another, and the flexible boot body extends from a first end portion that is sealed with the housing to a second end portion. The adapter is interposed between the second end portion of the flexible body and the shank portion of the stud, and the adapter holds the second end portion in a predetermined location relative to the shank portion.

The socket assembly advantageously allows for the same design of a flexible boot body to be used in conjunction with a range of differently sizes, shapes and configurations of studs. That is, a socket assembly manufacturer may mass produce a large quantity of the identical flexible boot bodies and attach those flexible boot bodies with differently shaped adapters for different applications. This reduces costs through economies of scale, particularly in view of the relatively large investment costs required to make the tooling required for injection molding flexible bodies of socket assembly boots.

According to another aspect of the present invention, the adapter is fixed for rotation with the stud.

According to yet another aspect of the present invention, the adapter is fixed for rotation with the flexible boot body.

According to still another aspect of the present invention, the adapter is made as one piece.

According to a further aspect of the present invention, the adapter is made of plastic.

According to yet a further aspect of the present invention, the adapter includes at least one retainer which engages with the second end portion of the flexible boot body.

According to still a further aspect of the present invention, the at least one retainer is a plurality of retainers that are spaced circumferentially from one another.

According to another aspect of the present invention, each of the retainers includes a finger with a protrusion that engages the second end portion of the flexible body.

According to yet another aspect of the present invention, the flexible boot body and the adapter present a labyrinth-like passage for allowing excessive lubricant to escape out of the moveable socket in one direction while restricting the passage of contaminants in an opposite direction.

According to still another aspect of the present invention, the labyrinth-like passage includes at least one axially extending groove and at least one radially extending groove formed into the adapter.

According to a further aspect of the present invention, the labyrinth-like passage includes a pair of radially extending grooves that are located diametrically opposite of one another.

Another aspect of the present invention is related to a method of making a socket assembly. The method includes the step of preparing a housing which has an inner bore. The method continues with the step of inserting a portion of a stud into the inner bore such that a shank portion of the stud is at least partially disposed outside the inner bore. The method proceeds with the step of engaging an adapter with a flexible boot body to present a boot. The method continues with the steps of sealing a first end portion of the flexible boot body with the housing and sealing the adapter with the shank portion of the stud. The method proceeds with the step of supporting a second end portion of the flexible boot body in a predetermined position relative to the shank portion of the stud with the adapter.

According to another aspect of the present invention, the method further includes the step of fixing the adapter for rotation with the stud.

According to yet another aspect of the present invention, the method further includes the step of fixing the adapter for rotation with the flexible boot body.

According to still another aspect of the present invention, the method further includes the step of injection molding the adapter.

According to a further aspect of the present invention, the method further includes the step of engaging at least one retainer, such as a finger with a protrusion, with the second end portion of the flexible body.

Yet another aspect of the present invention is related to a boot assembly. The boot assembly includes a flexible boot body that is made of a flexible material and extends from a first end portion to a second end portion. The boot assembly also includes an adapter which is made of a separate piece from the flexible boot body. The adapter includes at least one retainer that lockingly connects the adapter with the second end portion of the flexible boot body.

According to yet another aspect of the present invention, the at least one retainer includes a plurality of fingers with protrusions that engage with the second end portion of the flexible body.

According to still another aspect of the present invention, the adapter and the flexible boot body present a labyrinth-like passage for conveying grease in one direction and for restricting contaminants in an opposite direction.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENTS

Figure 1:
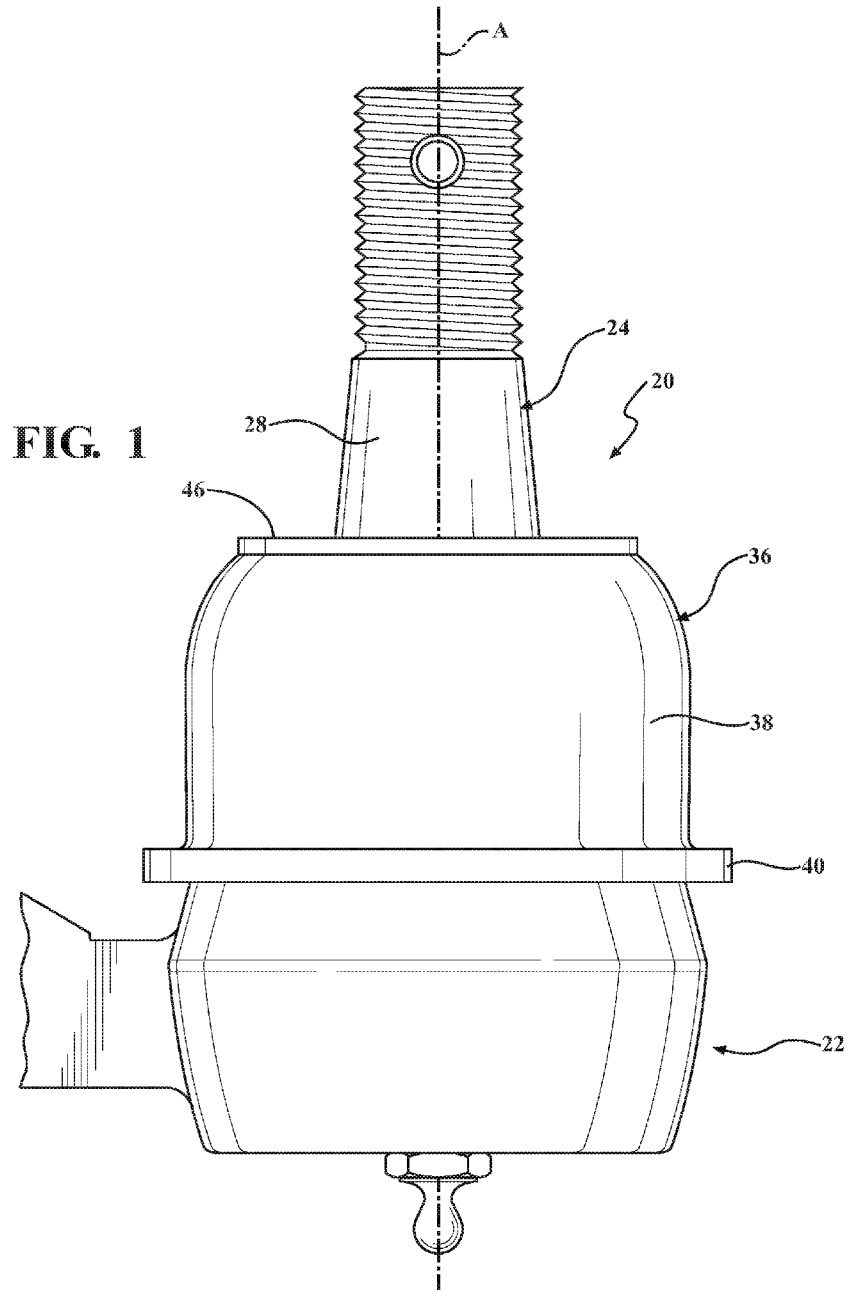
FIG. 1 a front elevation view of an exemplary embodiment of a moveable socket assembly.
Figure 2:
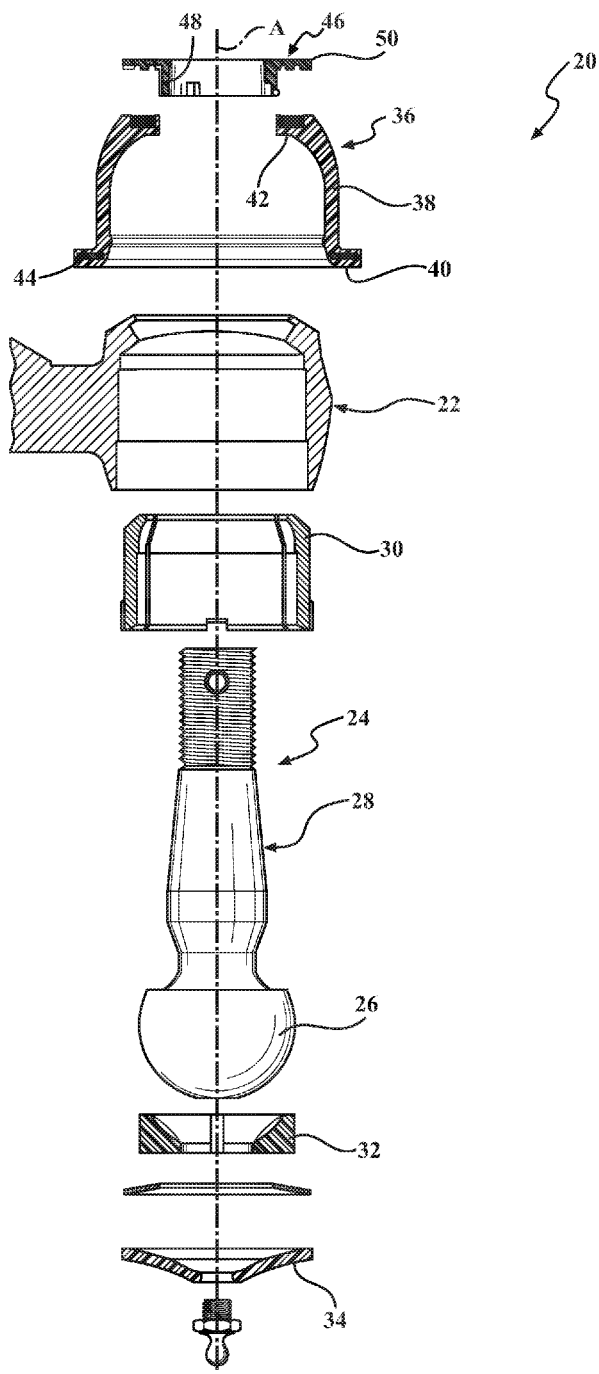
FIG. 2 is an exploded view of the moveable socket assembly of FIG. 1.
Figure 3:
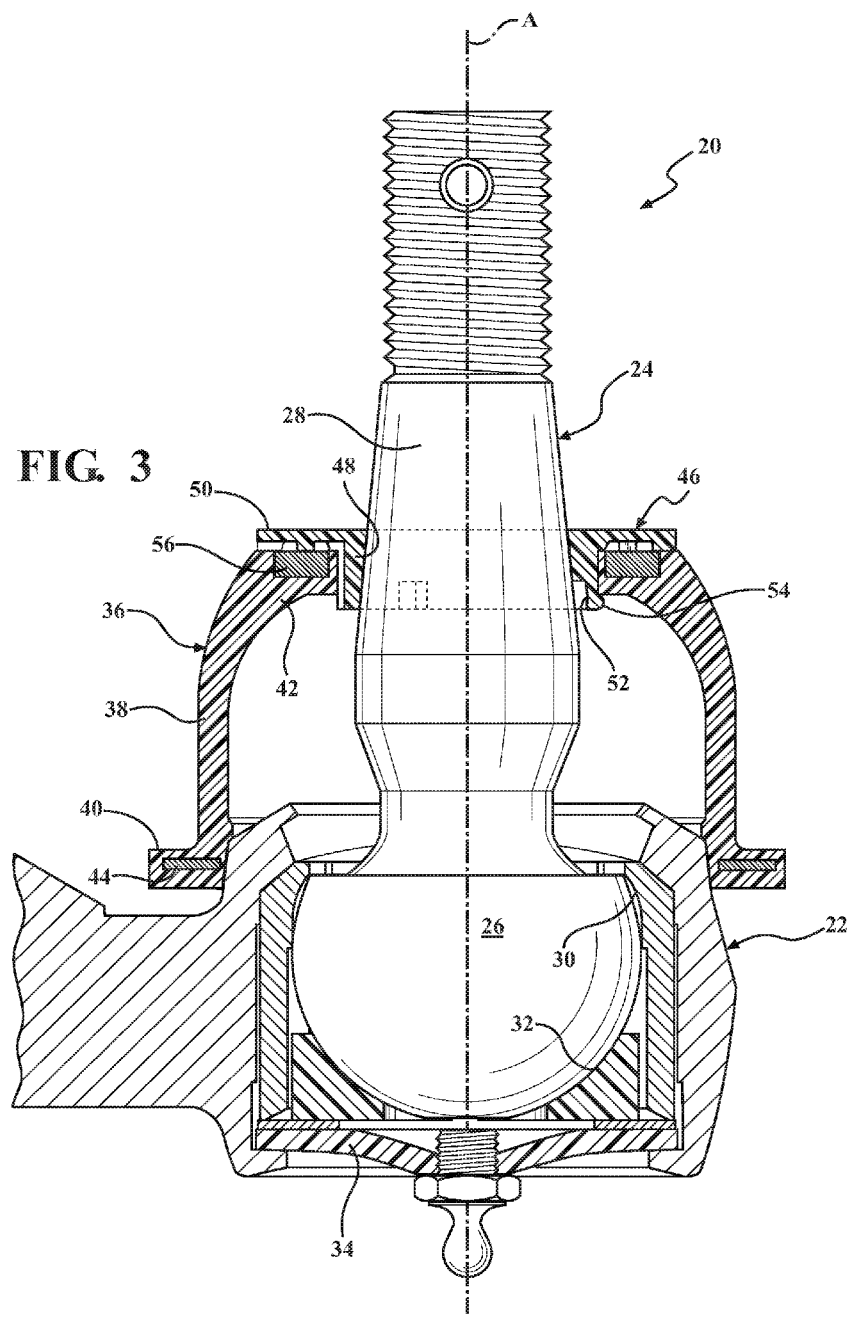
FIG. 3 is a cross-sectional view of the moveable socket assembly of FIG. 1.
Figure 4:
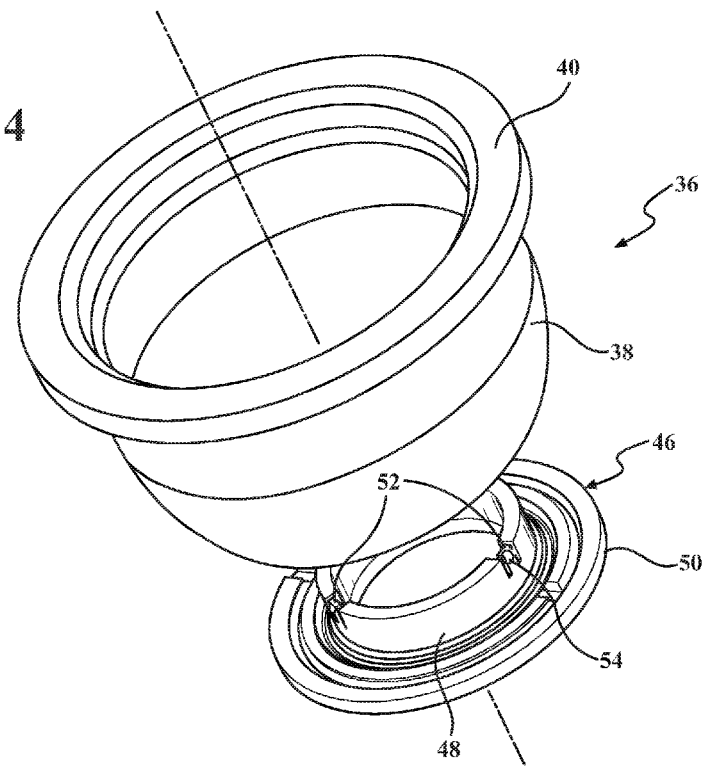
FIG. 4 is a perspective and exploded view of a boot assembly of the moveable socket assembly of FIG. 1.
Figure 5:
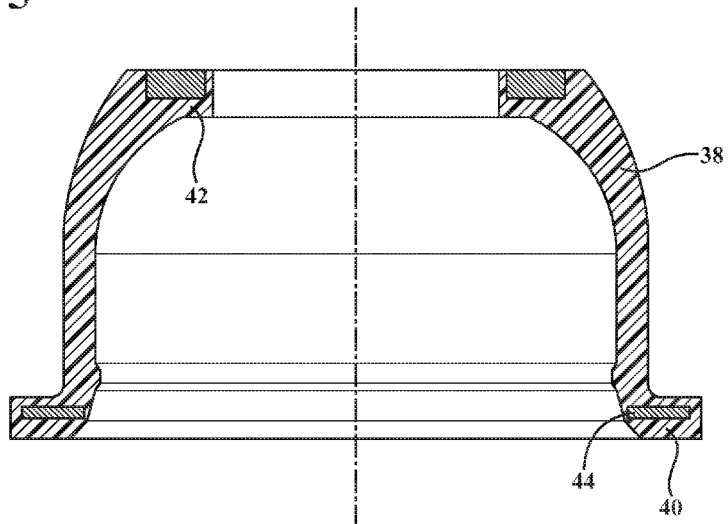
FIG. 5 is a cross-sectional view of an adapter of the boot assembly of FIG. 4.

Referring to the Figures, wherein like numerals indicate corresponding parts throughout the several views, an exemplary embodiment of a movable socket assembly 20 is generally shown in FIGS. 1-3. In the exemplary embodiment, the socket assembly 20 is a tie rod end that is configured to attach a tie rod (not shown) with a steering knuckle (not shown) of a steering system of a vehicle. However, it should be appreciated that the socket assembly 20 could find uses in a range of automotive and non-automotive applications.

The socket assembly 20 includes a housing 22 with an inner bore that extends from an open first end to an open second end. The exemplary housing 22 also includes a radially extending projection with a bore for attaching the housing 22 with the tie rod. However, it should be appreciated that the housing 22 may take a range of different configurations. For example, the housing could alternately be a cartridge which is configured to be pressed into an opening in another component, such as a control arm or a steering knuckle. A stud 24, which has a ball portion 26 and a shank portion 28, is partially received in the inner bore of the housing 22. Specifically, the ball portion 26 is disposed in the inner bore, and the shank portion 28 projects out of the inner bore through the second open end for connection with the steering knuckle (not shown). The shank portion 28 has a threaded end for receiving a nut (not shown) and a tapered region which tapers radially inwardly in a direction towards the threaded end. First and second bearings 30, 32 with curved bearing surfaces are also positioned in the inner bore between the ball portion 26 of the stud 24 and an inner wall of the housing 22. The curved bearing surfaces of the bearings 30, 32 are in surface-to-surface contact an exterior surface of the ball portion 26 to provide a low friction interface between the stud 24 and housing 22, thereby allowing the stud 24 and housing 22 to rotate or articulate relative to one another during operation of the vehicle. A cover plate 34 is received in the inner bore adjacent the first open end for trapping the ball portion 26 of the stud 24 and the first and second bearings 30, 32 in the inner bore.

A boot assembly 36 is sealed with the housing 22 and with the stud 24 for sealing a lubricant (such as grease) in and keeping contaminants out of the socket assembly 20. The boot assembly 36 includes a flexible boot body 38 that is made of an elastic material such as rubber. The flexible boot body 38 extends from a first end portion 40, which is sealed against an outer surface of the housing 22, to a second end portion 42. As shown in FIG. 3, in the exemplary embodiment, the first end portion 40 includes a boot insert 44 for retaining the flexible boot body 38 against the housing 22. However, it should be appreciated that the first end portion 40 of the flexible boot body 38 could be sealed against the housing 22 through any suitable means.

The second end portion 42 of the flexible boot body 38 is sealed against the shank portion 28 of the stud 24 by way of an adapter 46 which is made as a separate piece from the flexible boot body 38. The adapter 46 has an axial portion 48 that extends between opposite axial ends and a radial portion 50 that extends radially outwardly from one of the axial ends of the axial portion 48. The axial portion 48 has an inner surface which is in surface-to-surface contact with the shank portion 28 of the stud 24 and has an outer surface with a plurality of retainers 52 that lockingly connect the adapter 46 with the second end portion 42 of the flexible boot body 38. Specifically, the retainers 52 are a plurality of resiliently deflectable fingers 52 that are spaced apart from one another in a circumferential direction and which have protrusions 54 that extend in a radially outward direction to engage a lower surface of the second end portion 42 of the flexible boot body 38. In the exemplary embodiment, the adapter 46 is provided with three such fingers 52 that are equally spaced from one another, but any suitable number of fingers 52 may be employed. The adapter 46 is preferably made as a single piece of injection molded plastic.

A generally flat and annularly shaped boot ring 56 is partially embedded within the second end portion 42 of the flexible boot body 38 and is in surface-to-surface contact with the radial portion 50 of the adapter 46. In operation, the boot ring 56 supports the second end portion 42 of the flexible boot body 38 to resist deformation of the second end portion 42 as the housing 22 and stud 24 articulate relative to one another and also provides a low friction interface between the flexible boot body 38 and the radial portion 50 of the adapter 46. The boot ring 56 is preferably made of a hard plastic material, such as Nylon.

Figure 6:
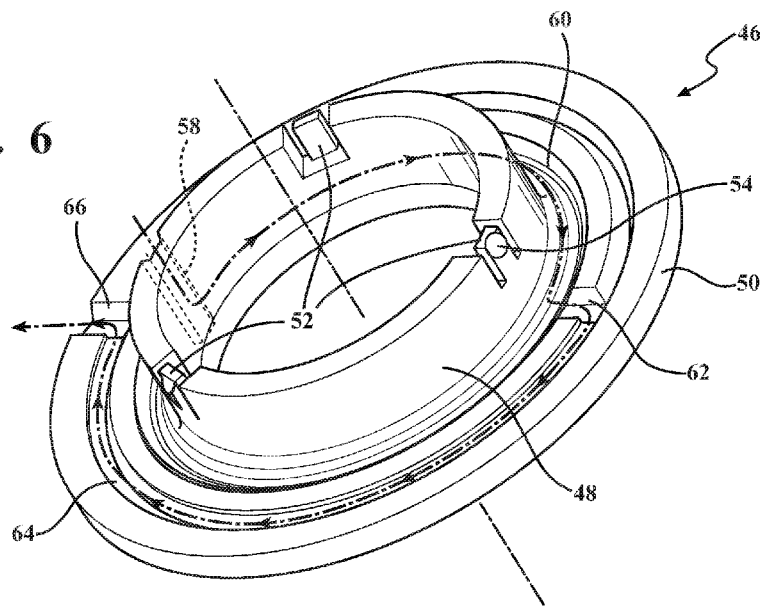
FIG. 6 is a perspective elevation view of a flexible body of the boot assembly of FIG. 4.
Figure 7:
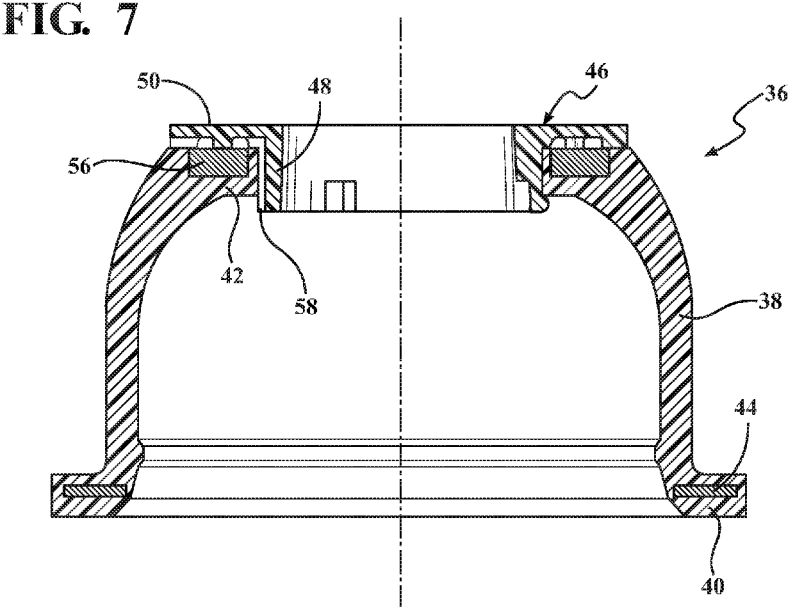
FIG. 7 is a cross-sectional view of the boot assembly of FIG. 4.

The boot assembly 36 also presents a labyrinth-like passage for allowing excessive grease to escape out of the socket assembly 20 while still restricting the passage of contaminants into the socket assembly 20. As indicated with arrows in FIG. 6, the passage includes an axially extending groove 58 which is formed into the outer surface of the axial portion 48 of the adapter 46. The axially extending groove 58 leads to a first annular groove 60 formed into the radial portion 50 of the adapter 46. Diametrically opposite of the axially extending groove 58, the adapter presents a first radial groove 62 for conveying the grease from the first annular groove 60 to a second annular groove 64 that surrounds the first annular groove 60. The radial portion 50 further presents a second radial groove 66, which is diametrically opposite of the first radial groove 62, for conveying the grease from the second annular groove 64 outside of the socket assembly 20. The labyrinth-like passage allows excess grease to be discharged out of the socket assembly 20 and prevent the flexible boot body 38 from ballooning or otherwise deforming from excess pressure.

Referring now to FIG. 3, depending on the particular application requirements, the boot assembly 36 can either be configured such that the adapter 46 is press-fit into a fixed engagement with the shank portion 28 of the stud 24 and rotates with the stud 24 relative to the flexible boot body 38 or such that the adapter 46 is fixed with the flexible boot body 38 and rotates relative to the stud 24 during operation of the vehicle. That is, the adapter 46 can be fixed with either the stud 24 or the flexible boot body 38 and rotate relative to the other.

The interposition of the adapter 46 between the flexible boot body 38 and the stud 24 allows the same flexible boot body 38 to be used in a wide range of different applications with differently shaped and sized studs 24 by simply changing the configuration of the adapter 46. This allows for simpler manufacturing of a range of different socket assemblies for different applications and allows for cost savings by eliminating the need to make different molds (which are typically very costly) for the flexible boot bodies of each of those applications.

Figure 8:
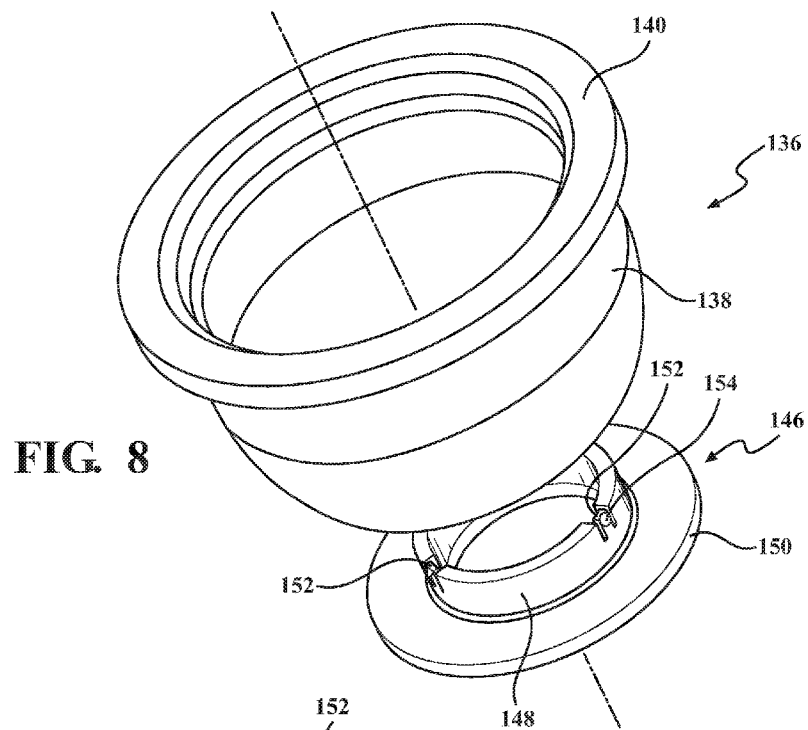
FIG. 8 is a perspective and exploded view of an alternate embodiment of the boot assembly.
Figure 9:
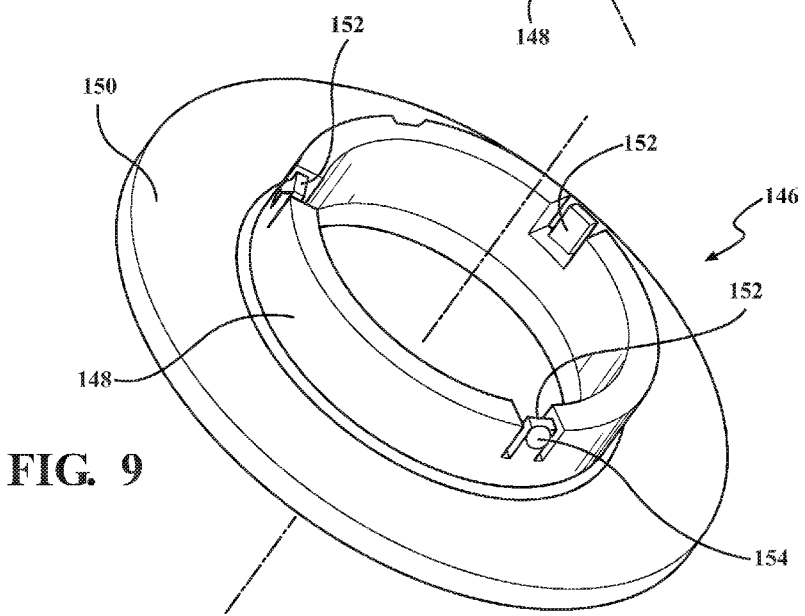
FIG. 9 is a perspective elevation view of an adapter of the boot assembly of FIG. 8.

Referring now to FIGS. 8 and 9, an alternate embodiment of the boot assembly 136 with like numerals, separated by a prefix of "1", indicating corresponding parts with the above-described embodiment. In the alternate embodiment, the adapter lacks the labyrinth-like passage of the above-described embodiment. That is, the axial and radial portions 148, 150 lack any grooves for expelling grease out of a socket assembly.

Referring back to FIGS. 1-7, another aspect of the present invention is related to a method of making a socket assembly 20. The method includes the step of preparing a housing 22 that has an inner bore. The method proceeds with the step of inserting a portion of a stud 24 into the inner bore such that a shank portion 28 of the stud 24 is at least partially disposed outside of the inner bore. The method continues with the step of injection molding an adapter 46. The method proceeds with the step of engaging the adapter 46 with a flexible boot body 38 to present a boot assembly 36. The method continues with the steps of sealing a first end portion 40 of the flexible boot body 38 with the housing 22 and sealing the adapter 46 with the shank portion 28 of the stud 24. The method proceeds with the step of supporting a second end portion 42 of the flexible boot body 38 in a predetermined position relative to the shank portion 28 of the stud 24 by way of the adapter 46. The adapter 46 may either be fixed for rotation with the stud 24 or with the flexible boot body 38. The method may further include the step of engaging a plurality of retainers 52 on the adapter 46 with the second end portion 42 of the flexible boot body 38.

Obviously, many modifications and variations of the present invention are possible in light of the above teachings and may be practiced otherwise than as specifically described while within the scope of the appended claims.

What is claimed is:

1. A moveable socket assembly, comprising:
a housing with an inner bore;
a stud projecting out of said inner bore of said housing and having a shank portion which is at least partially disposed outside of said inner bore;
a boot with a flexible boot body and an adapter which are independent pieces from one another; said flexible boot body extending from a first end portion that is sealed with said housing to a second end portion;
said flexible boot body having an interior;
said adapter directly contacting and sealed against said shank portion of said stud and separating said second end portion of said flexible boot body from said shank portion of said stud and said adapter holding said second end portion of said flexible body in a predetermined location relative to said shank portion;
said flexible boot body and adapter defining an interface;
and said interface between said adapter and said flexible boot body including a labyrinth of passages for guiding a lubricant from said interior of said boot body to outside said boot assembly, said labyrinth of passages including:
an axial passage in fluid connection with said interior of said flexible boot body,
a first radial passage for conveying lubricant out of said moveable socket assembly,
a first circumferential passage establishing fluid connection between said axial passage and said first radial passage,
a second circumferential passage in fluid connection with said first radial passage,
a second radial passage in fluid connection with said second circumferential passage, and
wherein said interface is configured such that for the lubricant to pass from said interior of said boot body to outside said boot body the lubricant must pass sequentially through each of said axial passage, said first circumferential passage, said first radial passage, said second circumferential passage, and said second radial passage.

2. The moveable socket assembly as set forth in claim 1 wherein said adapter is fixed with said stud for rotation relative to said flexible boot body.

3. The moveable socket assembly as set forth in claim 1 wherein said adapter is fixed with said flexible boot body for rotation relative to said stud.

4. The moveable socket assembly as set forth in claim 1 wherein said adapter is made as one piece.

5. The moveable socket assembly as set forth in claim 4 wherein said adapter is made of plastic.

6. The moveable socket assembly as set forth in claim 1 wherein said adapter includes at least one retainer which engages said second end portion of said flexible boot body.

7. The moveable socket assembly as set forth in claim 6 wherein said at least one retainer is a plurality of retainers that are spaced circumferentially from one another.

8. The moveable socket assembly as set forth in claim 7 wherein each of said retainers includes a finger with a protrusion that engages said second end portion of said flexible body.

9. The moveable socket assembly as set forth in claim 1 wherein said first circumferential passage forms a path connecting said axial passage and said first radial passage that traverses at least 180° about said stud.

10. A method of making a socket assembly, comprising the steps of:
preparing a housing that has an inner bore;
inserting a portion of a stud into the inner bore such that a shank portion of the stud is at least partially disposed outside of the inner bore;
engaging an adapter with a flexible boot body to present a boot;
sealing a first end portion of the flexible body with the housing and sealing the adapter with the shank portion of the stud;

supporting a second end portion of the flexible body in a predetermined position relative to the shank portion of the stud with the adapter;

inserting a fluid into an interior of the flexible boot body; and guiding the fluid through an axial passage in fluid connection with the flexible boot body and sequentially through each of a first circumferential passage in fluid connection with the axial passage, through a first radial passage in fluid connection with the first circumferential passage, through a second circumferential passage, through a second radial passage, and then out of the socket assembly.

11. The method as set forth in claim 10 further including the step of fixing the adapter for rotation with the stud.

12. The method as set forth in claim 10 further including the step of fixing the adapter for rotation with the flexible boot body.

13. The method as set forth in claim 10 further including the step of injection molding the adapter.

14. The method as set forth in claim 10 further including the step of engaging at least one retainer on the adapter with the second end portion of the flexible boot body.

15. The method as set forth in claim 14 wherein the at least one retainer includes a finger with a protrusion that engages the second end portion of the flexible body.

16. A boot assembly, comprising:

a flexible boot body made of a flexible material and extending from a first end portion to a second end portion;

said flexible boot body having an interior;

an adapter made of a separate piece from said flexible body;

said adapter including at least one retainer lockingly connecting said adapter with said second end portion of said flexible boot body;

said flexible boot body and adapter defining an interface; and said interface between said adapter and said flexible boot body including a labyrinth of passages for guiding a lubricant from said interior of said boot body to outside said boot assembly, said labyrinth of passages including:

an axial passage in fluid connection with said interior of said flexible boot body, a first radial passage for conveying lubricant out of said moveable socket assembly, a first circumferential passage establishing fluid connection between said axial passage and said first radial passage, a second circumferential passage in fluid connection with said first radial passage, a second radial passage in fluid connection with said second circumferential passage, and wherein said interface is configured such that for the lubricant to pass from said interior of said boot body to outside said boot body the lubricant must pass sequentially through each of said axial passage, said first circumferential passage, said first radial passage, said second circumferential passage, and said second radial passage.

17. The boot assembly as set forth in claim 16 wherein said at least one retainer is further defined as a plurality of fingers with protrusions that engage with said second end portion of said flexible boot body.

18. The boot assembly as set forth in claim 16 wherein said first circumferential passage forms a path connecting said axial passage and said first radial passage that traverses at least 180° about said adapter.

* * * * *